H. W. BARSON.
COIN CONTROLLED WEIGHING SCALE.
APPLICATION FILED JAN. 19, 1914.
1,214,499.
Patented Feb. 6, 1917.
3 SHEETS—SHEET 2.
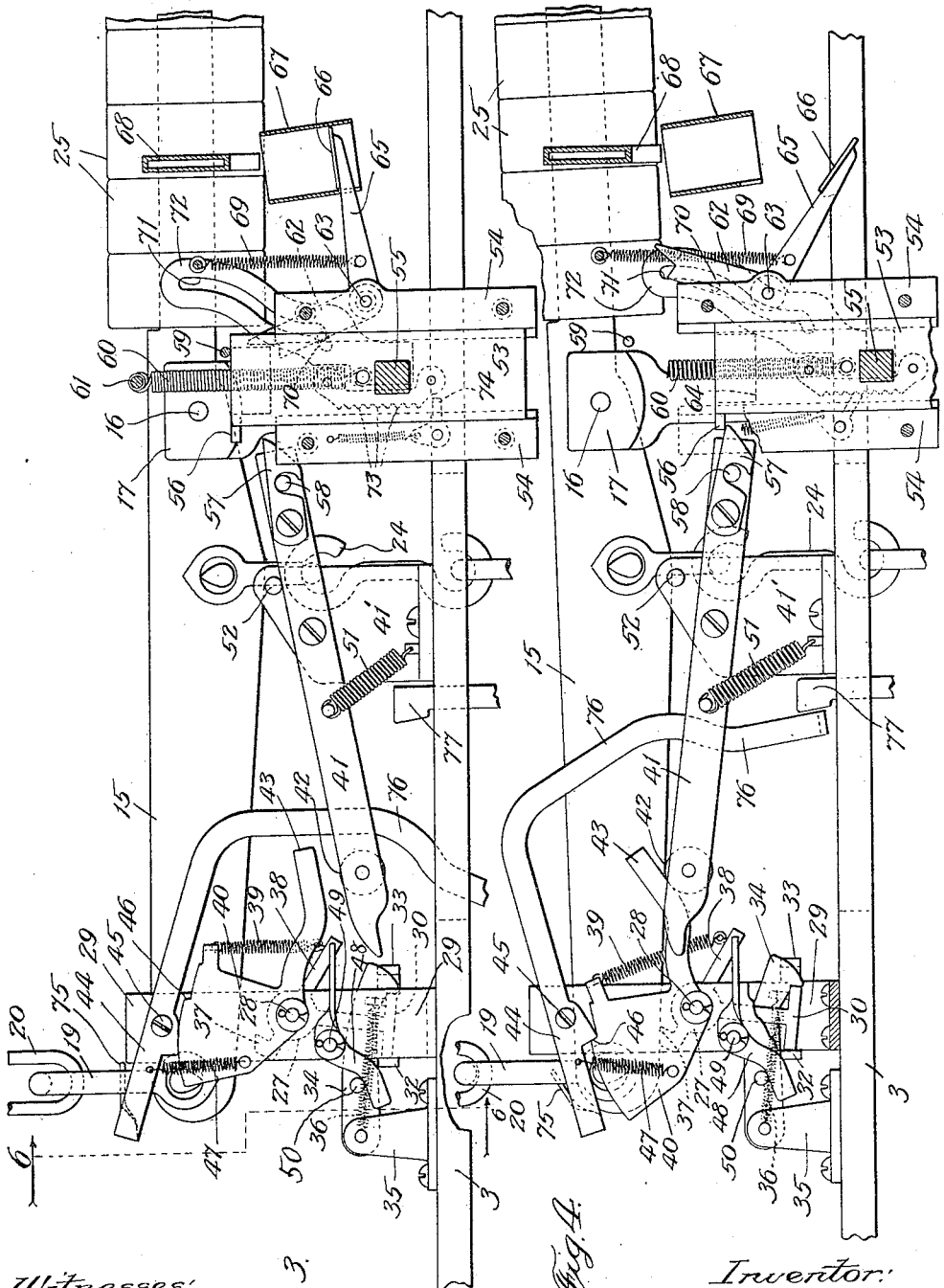

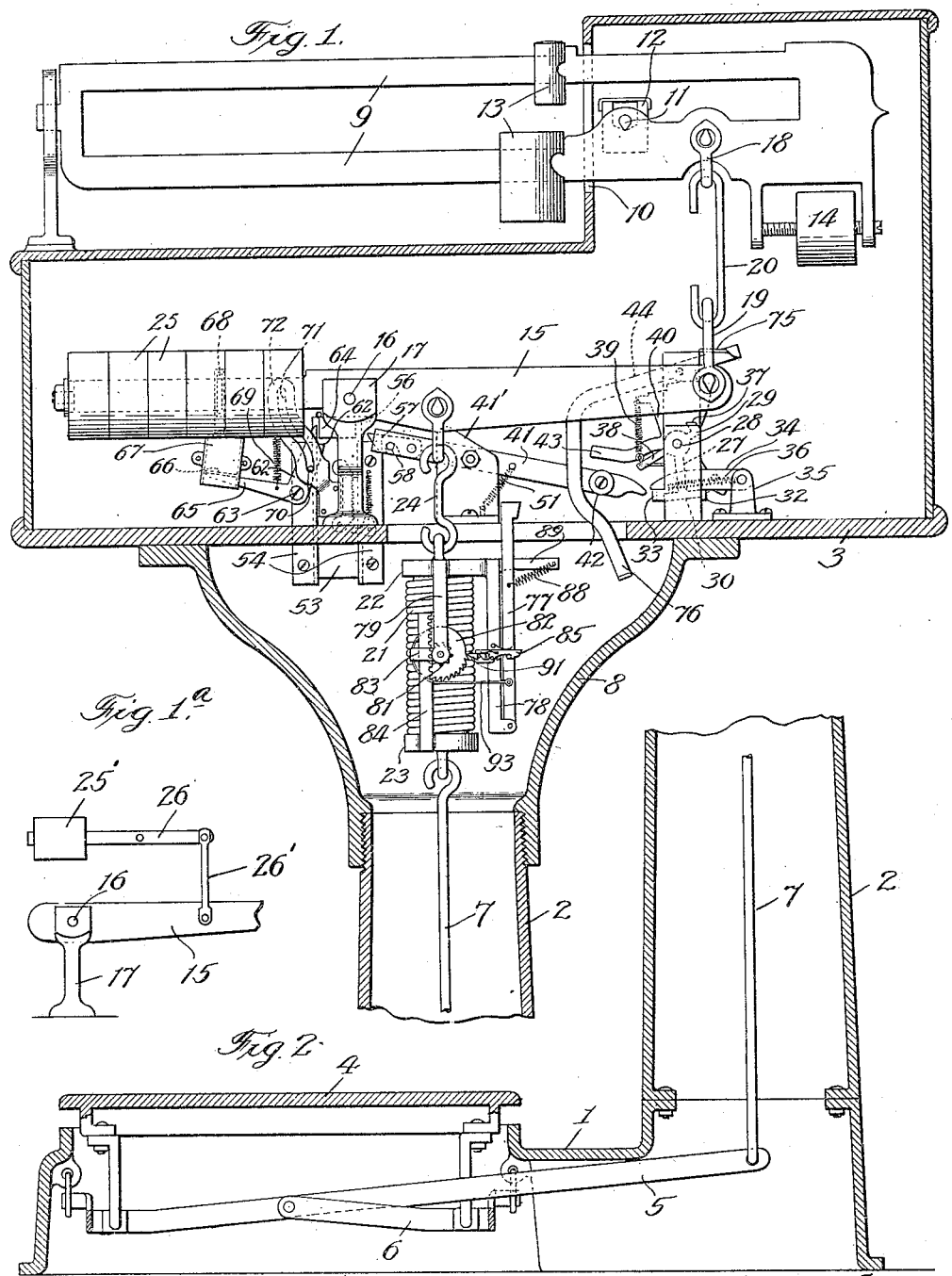

H. W. BARSON.
COIN CONTROLLED WEIGHING SCALE.
APPLICATION FILED JAN. 19, 1914.

1,214,499.

Patented Feb. 6, 1917.
3 SHEETS—SHEET 3.

Witnesses.

Inventor:
Harry W. Barson
By Peirce, Fisher & Clapp
Attys.

UNITED STATES PATENT OFFICE.

HARRY W. BARSON, OF CHICAGO, ILLINOIS, ASSIGNOR TO ACME SCALE CO., A CORPORATION OF ILLINOIS.

COIN-CONTROLLED WEIGHING-SCALE.

1,214,499.  Specification of Letters Patent.  Patented Feb. 6, 1917.

Application filed January 19, 1914. Serial No. 813,041.

*To all whom it may concern:*

Be it known that I, HARRY W. BARSON, a citizen of the United States, and a resident of Chicago, county of Cook, and State of Illinois, have invented certain new and useful Improvements in Coin-Controlled Weighing-Scales, of which the following is a full, clear, and exact description.

The invention relates to coin-controlled weighing scales of that type employing a counter-balancing beam for determining the weight.

In most coin-controlled scales, the weight is determined by variably stretching or compressing a spring, the amount of compression or stretching of which is indicated by a suitable pointer. Such scales are apt to be inaccurate because the strength of the springs, upon which the accuracy depends, varies from time to time.

The present invention seeks to provide simple and effective means whereby the operation of a scale having a counter-balancing beam can be coin-controlled and which means will not interfere with the proper accurate operation of the scales.

A further object of the invention is to provide means to prevent the use of the scales for more than a single operation after a coin has been deposited therein.

The invention consists in the features of improvement hereinafter set forth, illustrated in the accompanying drawings and more particularly pointed out in the appended claims.

Figure 5:
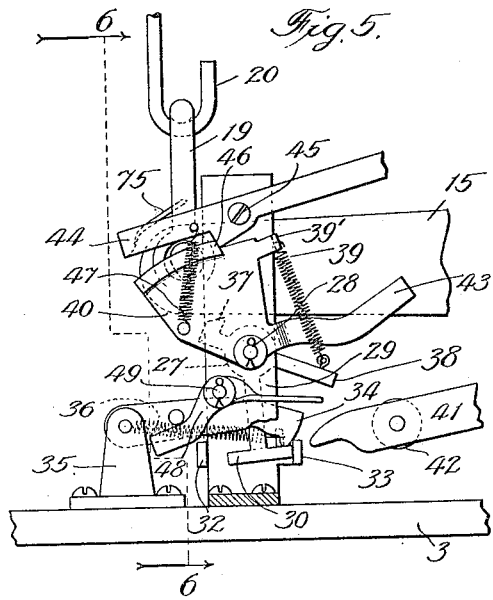
Figure 6:
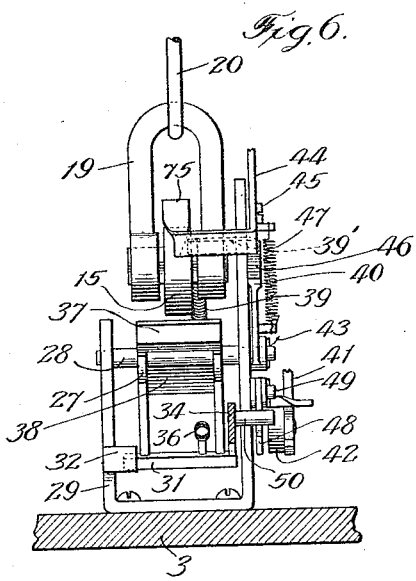
Figure 7:
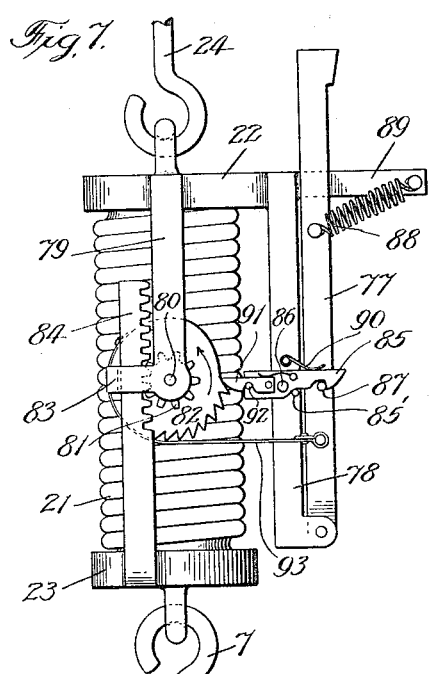
Figure 8:
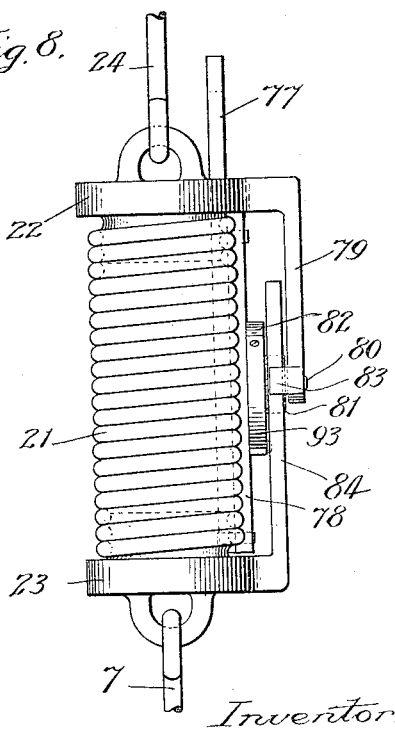

Figure 1 is a view of the upper portion of the scales with the inclosing casing shown in section. Fig. 1ª is a detail view illustrating a modification. Fig. 2 is a vertical section of the lower portion of the scales. Fig. 3 is an enlarged detail view of the coin-controlled mechanism showing the parts in normal position. Fig. 4 is a similar view showing the parts in shifted position. Fig. 5 is a view in elevation of the coin-controlled locking mechanism shown in released position. Fig. 6 is an end view of parts shown in Fig. 5. Figs. 7 and 8 are front and side views of the means employed for restoring the locking mechanism to operative condition and which prevents the use of the scales for more than a single operation for each coin deposited.

The improved scale is designed for weighing persons and is of the platform type.

The construction shown comprises a base 1, a hollow standard 2 mounted on one end of the platform and an inclosing casing or head 3 at the upper end of the standard. The platform 4 is arranged above an opening in the base and is mounted in a suitable manner upon weighing levers 5 and 6 of ordinary construction, the free end of the lever 5 being connected to a rod or link 7 which extends upwardly through the hollow standard 2.

In the construction shown, the casing 3 is mounted upon a hollow neck 8 which in turn is mounted upon the upper end of the standard 2. The casing 3 is L-shaped and a counter-balancing weighing beam 9 is pivotally mounted in its upper portion and projects outwardly through an opening 10 therein. The beam 9 is provided with pivots 11 which engage suitable bearings 12 that project inwardly from the side walls of the casing 3. The beam is double, as shown, and each section thereof is provided with a sliding counter-poise 13. The exposed portion of the counter-balancing beam is provided in the ordinary manner with scales over which the counter-weights 13 may be moved to counter-balance a weight placed upon the platform and determine its amount. The portion of the beam within the head or casing 3 is preferably provided with an adjusting counter-poise 14. The parts thus far described may be of any usual or suitable construction.

A lever 15 is arranged within the horizontal portion of the head or casing 3 and is pivoted at 16 to a standard 17 which extends upwardly from the lower portion of the casing. This lever is connected to the platform and to the counter-balancing beam to transmit the force of the weight on the platform to the beam. Members which are normally disengaged or have a lost-motion or slack connection between them, are interposed in the connections between the platform and the weighing beam and such members are preferably interposed between the end of the lever 15 and the counter-balancing beam 9. As shown, these connections comprise U-shaped links 18 and 19 engaging pivot pins on the beam and lever, respectively, and an intermediate connecting link 20. As shown most clearly in Fig. 3, the ends of these links are not normally in engagement and they form a lost-motion connection between the lever 15 and beam 9, and which lost-motion must be taken up before these parts are connected to effect the proper operation of the scales.

The lever 15 is connected, between its end and its pivot 16, to the weighing levers 5 and 6 whereon the platform is mounted and, if desired, may be connected directly to the rod 7. In the construction shown, a heavy coiled spring 21 is interposed in this connection. As shown this spring is connected at its ends to cap pieces 22 and 23, the upper cap piece being connected to the lever by a link 24 and the lower cap piece being connected to the upper end of the link or rod 7. The function of this spring will be hereinafter set forth. During the weighing operation, it is stretched to a slight extent. It is sufficiently heavy to properly transmit the force due to the weight on the platform. A counter-weight is connected to the lever 15 for holding the lost-motion connection between it and the weighing beam in slack condition. In the form shown in Fig. 1, the beam is extended beyond its pivot 16 and a counter-weight 25 is mounted thereon. This weight is sufficient to balance the unweighted platform and connecting parts and upholding the lever, so that the connections between it and the beam are maintained in slack condition. If desired, a counter-weight 25' may be connected to a supplemental lever 26, the latter being pivoted upon the walls of the casing between its ends and connected by a link 26' to the lever 15, as shown in Fig. 1ª.

A coin-controlled stop device is arranged below the free end of the lever 15. This stop device 27 is mounted to swing on a pivot or shaft 28 which is carried by a bracket 29 that projects up from the bottom of the casing 3. An abutment 30 on the lower portion of the stop device is arranged to coöperate with two fixed lugs 32 and 33 on the bracket to limit the extent of movement of the stop device. A latch 34 pivoted on a bracket 35 is provided with a hooked end which engages the abutment 30 of the stop device and holds it in the normal position shown in Fig. 3, with the abutment against the stop 32. A spring 36 is connected to a pivot of the latch 34 and to the lower portion of the stop device and serves to restore the stop device to normal position. The stop device is provided at its upper end with an offset portion 37 which extends beneath the end of the lever 15. When a weight is placed on the platform, the lever 15 is drawn down against the force exerted upon it by the counterweight 25 until its end engages the portion 37 of the stop device. This position is indidated in Fig. 4, and in this position there is still some slack in the lost-motion connection between the lever and the beam 9, so that the force exerted upon the lever 15 will not be properly transmitted to the weighing beam and the weight cannot be determined.

The stop device is provided with an arm 38 which is connected by a spring 39 to a segment-shaped member 40 which is mounted on one end of the pivot shaft 28. A shift lever 41 is pivoted between its ends upon a bracket 41' and is provided with a roller 42 on one side which is arranged to engage an arm 43 on the member 40, and so turn the latter about the pivot shaft 28 to place the spring 39 under tension, as shown in Fig. 4. The member 40 is held in this position by a latch 44 which is connected by a pivot 45 to the upper end of the bracket 29. This latch is provided with a projection which is arranged to engage a shoulder 46 on the member 40 after the latter has been turned about its pivot by the shift lever 41. The latch 44 is held in engaged position by a spring 47 connected to the latch and to the member 40.

A trip 48 is mounted between its ends upon a pivot pin 49 carried by the bracket 29. One end of this trip is held by gravity in engagement with a pin 50 on the side of the locking dog 34. The other end of the trip is arranged to be engaged by the end of the shifting lever 41 and on the downward movement of the latter, the trip is shifted to release the locking dog.

The end of the lever 41 at the left, as shown in Figs. 3 and 4, is normally held depressed by a spring 51 connected to the lever and to the bracket 42. The opposite or right hand end of the lever normally engages a stop pin 52 on the bracket. The lever is shifted against the tension of the spring 51 by a slide 53 which is arranged in guideways 54 on the side wall of the casing 3. This slide is provided with a projection 55 which extends outwardly through a slot in the casing 3 and which may be operated by the user of the machine. The slide has a projection 56 at its upper end which is arranged to engage a dog 57 pivoted on the end of the lever 41 and engaging a pin 58 fixed thereto.

The slide is held normally uplifted against a fixed stop 59 by a spring 60 connected to the slide and to a fixed pin 61. A latch 62 mounted on a fixed pivot 63 extends beneath an abutment 64 on the upper portion of the slide and normally prevents the depression of the slide. The latch is provided with a laterally projecting arm 65 having a plate 66 thereon which forms the movable bottom of a fixed hopper 67. A coin chute 68 is arranged to deliver the inserted coin into the hopper 67 and onto the plate 66. A light spring 69 holds the latch in normal operative position. A pin 70 on the side of the latch is arranged within a curved cam slot 71 formed upon a part 72 that projects from the slide. The slide is preferably provided with a full stroke device comprising a series of rack teeth 73 and a spring-held pawl 74.

In operation, the user of the machine will stand upon the platform and through the medium of the weighted levers 5 and 6 and the connections between the lever 5 and the lever 15 will draw the latter down until it engages the stop bar 37. This, as stated, does not take up all the slack or lost-motion in the connections between the lever and the beam, so that the weight on the platform cannot be determined. But if a coin is inserted its weight upon the plate 66 of the arm 65 will overcome the spring 69 and shift the latch 62 so that the slide 53 may be depressed through the medium of the projecting finger 55. This depression of the slide will move the right hand end of the shifting lever 41 downwardly and will lift its left hand end. The upward movement of the left hand end of the lever will bring the roller thereon into engagement with the arm 43 and so shift the member 40 and place the spring 39 under tension. The member 40 is locked in this position by the engagement of the projection on the latch 44 with the shoulder 46. This position of the parts is shown in Fig. 4. The left hand end of the lever upon its upward movement will engage and lift the adjacent end of the trip 48 but this movement will have no effect upon the locking dog 34. At the end of the downward movement of the slide 53, the lug 56 thereon will be disengaged from the dog 57 on the lever 41 and the latter is returned to its normal position by the spring 51. This, of course, moves the left hand end of the lever downwardly and it thereupon strikes and depresses the right hand end of the trip 48. The left hand end of the trip is lifted and the locking dog 34 is raised. The stop device is then released and, inasmuch as the spring 39 connected thereto is under tension and is stronger than the spring 36, it will shift the stop device until the abutment 30 thereon engages the lug 33. This position of the parts is shown in Fig. 5. This shift of the stop device moves the bar 37 thereon to such an extent that the lever 15 may be further depressed to take up all slack or lost-motion in the connection between it and the weighing beam, so that the weight on the platform may then be determined.

It should also be noted that the shift of the slide 53 swings the latch 62, arm 65 and hopper bottom 66 through the medium of the cam member 72, so that the inserted coin is discharged from the mechanism.

At the end of the weighing operation, the counter-weight 25 overbalances the unweighted platform and lifts the lever 15 until its free end engages the end of a U-shaped extension 75 on the latch 44. This extension, as shown, is arranged above the end of the lever 15. This upward movement of the lever 15 thus trips the latch 44 and releases the member 40. The tension on the spring 39 is thus relieved and the spring 36 operates to restore the locking device and the parts associated therewith to the normal position shown in Figs. 1 and 3. The machine is then ready for the succeeding operation.

A second person could be weighed if he changed places on the platform with a person whose weight had already been determined, provided the pressure on the platform was not relieved to an extent sufficient to permit the upward movement of the lever 15. To avoid this I provide additional means for tripping the latch 44 so that the parts may be restored to the normal locked position. For this purpose, one end of the latch 44 is provided with a downturned end portion 76 which is arranged to coöperate with the upper end of a trip 77. This trip is pivoted on the lower end of an arm 78 which is fixed to and depends from the cap piece 22 that is connected to the upper end of the spring 21. An arm 79 also depending from the cap piece carries a short shaft 80 upon which is mounted a gear wheel 81 and a ratchet wheel 82. The lower end of the arm is also provided with a guide 83 for a toothed rack 84 which extends upwardly from the cap piece 23 that is connected to the lower end of the spring. The teeth of this rack engage the teeth of the pinion or gear 81.

A latch 85 is pivoted at 86 to the side of the arm 78 and is provided with a hooked end which engages a pin 87 on the side of the trip 77. A spring 88 is connected to the latter and to the end of an extension 89 that projects laterally from the cap piece 22. The latch 85 is held in engagement with the pin 87 and with a stop pin 85' by a spring 90. A dog 91 pivoted on the latch is spring-held in engagement with a pin 92 thereon and this dog is arranged to coöperate with a series of teeth formed upon the ratchet 82. This ratchet is mutilated and the teeth only extend partly around its periphery, as most clearly shown in Fig. 7. A strap or cord 93 extends about the periphery of the wheel 82 and is connected to the trip 77.

When the locking stop device 27 is held in released position by the spring 39 and latch 44, the extended end portion 76 of the latter is arranged adjacent the upper end of the trip 77, as shown in Fig. 4. The weight on the platform will slightly stretch the heavy spring 21 and the relative movement of the rack 84 and gear 81 will turn the latter and the ratchet wheel 82 in the direction indicated by the arrow in Fig. 7. During this movement, the ratchet teeth will move idly beneath the end of the dog 91. If the platform is partly or entirely relieved of weight, the ratchet wheel will be turned in the opposite direction and one of the teeth will, through the medium of the dog 91, depress the left hand end of the latch 85 and lift its right hand end out of engagement with the pin 87. The spring 88 will then actuate the trip 77 and so release the latch 44. The locking parts are then returned to normal operative position, even though the weight upon the platform is not entirely relieved. This prevents a second person from obtaining a direct indication of his individual weight by stepping on the scales before the weight of the first person is entirely removed, since, when the first person is completely removed from the platform the total weight thereon is decreased and the trip 77 will be actuated, as described, to release the latch 44. When the weight on the platform is entirely relieved, the spring 21 will complete the return of the gear wheel 81 and ratchet 82 to normal position and the strap 93, will be wound upon the periphery of the ratchet 82 and so return the trip 77 to normal position in engagement with the latch 85. Inasmuch as the spring 21 and all parts connected thereto are mounted entirely upon the operating connections between the platform and the weighing beam and is free to move therewith, they do not interfere with the accuracy of operation of the scales. No other spring is connected to the movable counterbalancing parts and it should be particularly noted that no spring is so interposed between these parts and the framework of the machine as to tend to restrict their freedom of movement. For this reason the scales may be used to accurately determine the weights placed upon the platform and the determination of such weights is in no way dependent upon the extent to which a spring is compressed or stretched.

It is obvious that numerous changes may be made in the details set forth without departure from the essentials of the invention.

I claim as my invention:—

1. In a weighing scale, the combination with a platform, of a counter-balancing weighing beam, normally inoperative connections between said platform and said counter-balancing beam, coin-controlled means for rendering said connections operative, and a weight connected to said platform for counter-balancing the same independently of said beam and for restoring said connections to normal inoperative condition.

2. In a weighing scale, the combination with a platform, of a counter-balancing weighing beam, normally inoperative, coöperating members connected respectively to said platform and to said beam, coin-controlled means for effecting the operative engagement of said members, and a weight connected to said platform for counter-balancing the same independently of said beam and for restoring said connections to normal, inoperative condition.

3. In a weighing scale, the combination with a platform, of a counterbalancing weighing beam, coöperating movable members connected respectively to said platform and said counterbalancing beam, a stop device for preventing the operative movement of said members, coin-controlled means for releasing said stop device, a weight connected to said platform for counter-balancing the same independently of said beam and for restoring said stop device to operative position.

4. In a weighing scale, the combination with a platform, of a counter-balancing weighing beam, coöperating members connected respectively to said beam and to said platform and having a lost-motion engagement, a stop device normally preventing the operative movement of said connecting members, coin-controlled means for releasing said stop device, and a counter-weight connected to said platform and arranged to counter-balance the same independently of said beam and restore said stop device to normal operative position.

5. In a weighing scale, the combination with the machine frame and a platform, of weighing levers whereon said platform is mounted, of a counter-balancing weighing beam, an intermediate lever pivotally mounted on the machine frame and connected to said weighing levers, connecting parts between said lever and said beam having a lost-motion connection, a stop device normally preventing the operative movement of said lever and said beam, coin-controlled means for releasing said stop device, and a weight connected to said lever for counter-balancing the unweighted platform independently of said beam and for restoring said stop device to its normal operative condition.

6. In a weighing scale, the combination with the machine frame and a platform and weighing levers whereon said platform is mounted, of a counter-balancing weighing beam, an intermediate lever pivotally mounted on the machine frame and connected to said weighing levers, members, having a lost-motion engagement, connected respectively to said intermediate lever and to said weighing beam, a stop device normally preventing the operative movement of said intermediate lever, coin-controlled means for releasing said stop device, a latch for holding said stop device in released position, and a weight connected to said intermediate lever for counter-balancing said platform and restoring said lever to normal position independently of said beam, said lever being arranged to trip said latch when restored to normal position.

7. In a weighing scale, the combination with a machine frame and a platform, of a counter-balancing weighing beam, an intermediate counter weighted lever pivotally mounted on the machine frame and connected to said platform, normally inoperative connections between said intermediate lever and said weighing beam and coin-controlled means for rendering said connections operative, said intermediate, counter-weighted lever being arranged to counter-balance the unweighted platform and restore said connections to normal inoperative position independently of said weighing beam.

8. In a weighing scale, the combination with a machine frame and a platform, of a counter balancing weighing beam, an intermediate counter-weighted lever pivotally mounted on the machine frame and connected to said platform, connecting parts between said intermediate lever and said weighing beams having lost motion connection, a stop device normally preventing the operative movement of said intermediate lever, and coin-controlled means for releasing said stop device, said intermediate counter-weighted lever being arranged to counter-balance the unweighted platform and restore said stop device to its normal operative position independently of said weighing beam.

9. In a weighing scale, the combination with a platform, of a counterbalancing weighing beam therefor, connections between said beam and said platform, a stop device normally preventing the operative movement of said connections, a latch for holding said stop device in operative position, a spring for shifting said stop device to inoperative position, a shift lever arranged, when moved in opposite directions, to successively place said spring under tension and release said latch, coin-controlled means for actuating said lever, a second latch for holding said spring under tension, and a counter-balancing device arranged to restore said connections to normal condition and release said second latch.

10. In a weighing scale, the combination of a platform, a counter-balancing weighing beam, connections between said beam and said platform, a spring interposed in said connections and bodily and freely movable therewith, a stop device for normally holding said connections in inoperative condition, coin-controlled means for releasing said stop device, and means controlled by said spring and actuated by variations in weight upon said platform for restoring said stop device to its normal position.

11. In a weighing scale, the combination of a platform, a counter-balancing weighing beam, connections between said beam and said platform, a spring interposed in said connections and bodily and freely movable therewith, a stop device for normally holding said connections in inoperative condition, coin-controlled means for releasing said stop device, a latch for holding said stop device in inoperative position and means controlled by said spring and actuated by variations in weight upon said platform for releasing said latch.

12. In a weighing scale, the combination of a platform, a counter-balancing weighing beam, an intermediate pivoted lever, connections between said lever and said platform, a spring interposed in said connections and bodily movable therewith, lost motion connections between said lever and said weighing beam, a stop device normally held in operative position to prevent the operative movement of said lever and said beam, coin-controlled means for releasing said stop device, a latch for holding said stop device in inoperative position and a trip for said latch arranged to be actuated by said spring when the weight upon said platform is varied.

HARRY W. BARSON.

Witnesses:
CHARLES J. RYAN,
WALTER F. ROSENUMPEL.

Copies of this patent may be obtained for five cents each, by addressing the "Commissioner of Patents, Washington, D. C."